United States Patent [19]

Calve

[11] Patent Number: 5,173,527

[45] Date of Patent: Dec. 22, 1992

[54] FAST CURE AND PRE-CURE RESISTANT CROSS-LINKED PHENOL-FORMALDEHYDE ADHESIVES AND METHODS OF MAKING SAME

[75] Inventor: Louis R. Calve, Aylmer, Canada

[73] Assignee: Forintek Canada Corp., Ottawa, Canada

[21] Appl. No.: 700,281

[22] Filed: May 15, 1991

[51] Int. Cl.⁵ .................... C08K 5/13; C08L 97/00
[52] U.S. Cl. ....................... 524/74; 524/72; 524/73
[58] Field of Search ...................... 524/72, 73, 74

[56] References Cited

U.S. PATENT DOCUMENTS

| | | | |
|---|---|---|---|
| 4,269,949 | 5/1981 | Hickson et al. | 525/58 |
| 4,433,120 | 2/1984 | Chiu | 525/501 |
| 4,579,892 | 4/1986 | Calve et al. | 524/74 |

Primary Examiner—Paul R. Michl
Assistant Examiner—Peter Szekely
Attorney, Agent, or Firm—Trevor C. Klotz

[57] ABSTRACT

Fast cure and "pre-cure" resistance thermosetting adhesives and methods for their production useful for binding lignocellulosic materials together, are disclosed.

A fast curing adhesive is obtained by cross-linking binary phenol-formaldehyde consisting of high average molecular weight phenolformaldehyde (PF) resin and low average molecular weight PF resin with lignin. A "pre-cure" resistant adhesive is obtained by cross-linking a PF resin, such as binary phenol-formaldehyde, with a lignin with the addition of ammonia preferably in the form of an ammonium salt. The lignin may be obtained from different wood pulping waste materials including that recovered from the sulphite, kraft, organosolv or steam hydrolysed wood pulping processes. The adhesive can be produced as an aqueous solution of dispersion, and used in either a basic or acidic environment. The quick setting and "pre-cure" resistant adhesive are inexpensive to produce and both display improved adhesion characteristics when compared with existing adhesives prepared from wood waste products. The adhesives also compare advantageously to a variety of existing commercial phenolic resin presently being used in the manufacture of wood composite products such as waferboards. These adhesives are capable of being spray dried more easily and produce higher yields, when compared with existing wood waste products which have been cross-linked with commercial PF resin or to a variety of existing commercial phenolic resins.

5 Claims, 1 Drawing Sheet

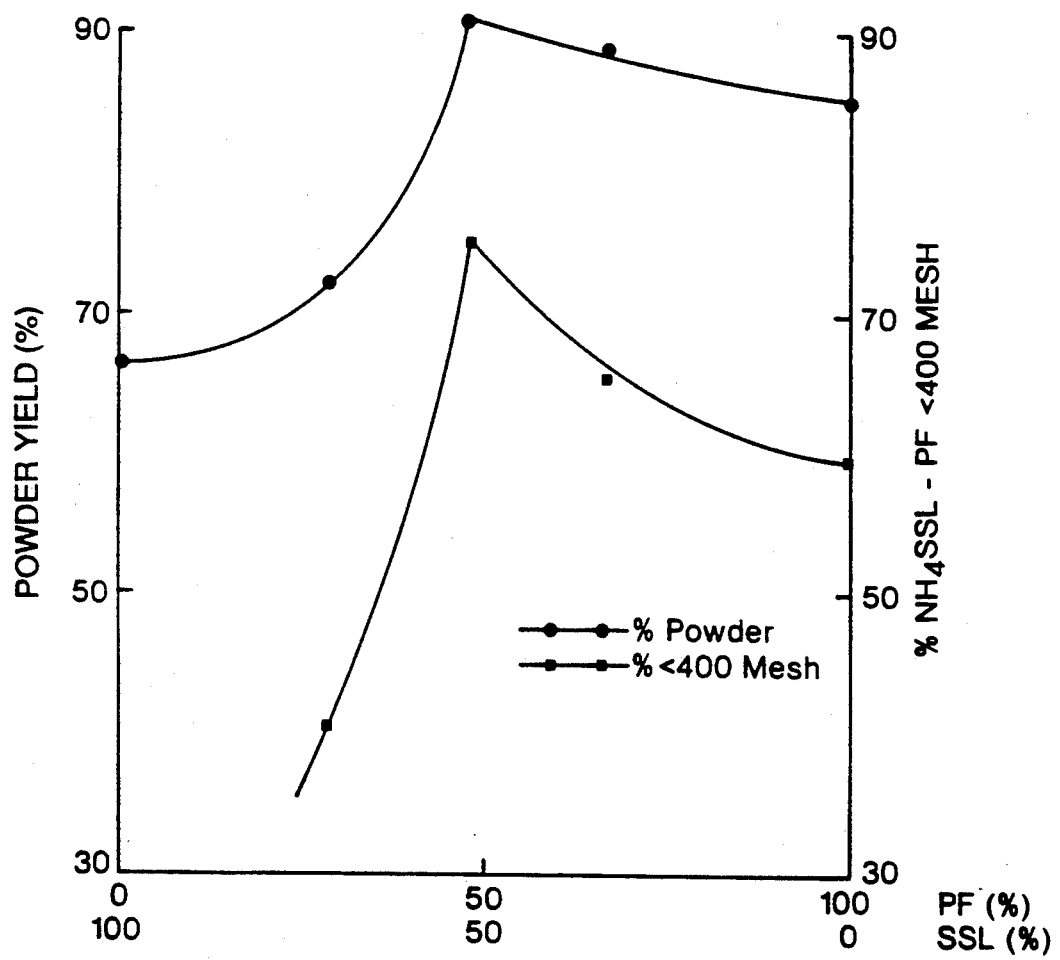
Figure 1. EFFECT OF NH4SSL-PF RATIO ON POWDER YIELD AND POWDER PARTICLE SIZE

FAST CURE AND PRE-CURE RESISTANT CROSS-LINKED PHENOL-FORMALDEHYDE ADHESIVES AND METHODS OF MAKING SAME

FIELD OF THE INVENTION

The present invention relates to a new and useful fast curing thermosetting adhesive comprised of cross-linked binary phenol-formaldehyde and lignin and additionally, an adhesive which can be rendered "pre-cure" resistant, as well as the methods of preparing same. The fast curing and "pre-cure" resistant adhesive may be used in the preparation of manufactured lignocellulosic products such as boards and panels employing sawdust, wood chips, wood wafers and the like.

BACKGROUND OF INVENTION

Phenol-formaldehyde (PF) adhesive resins have long been used as thermosetting binders in the preparation of manufactured boards or panels. Numerous attempts have been made to develop suitable substitute adhesives, which utilize wood waste, in order to not only meet growing environmental concerns, but to also reduce the dependence upon petroleum based constituents, the availability and cost of which is increasingly uncertain.

These attempts have included efforts to develop suitable adhesive binders by using PF to cross-link other possible adhesive constituents, including one or more waste products of wood processing. Unfortunately, to data these efforts have met with only limited success.

The range of wood waste products which have been successfully cross-linked is limited, and the methods used to produce these adhesive binders have been slow and laborious, often requiring pretreatment of the waste product constituent. Furthermore, the cure time and adhesion characteristics of these adhesive binders have been such that widespread use or acceptance of these substitutes by the manufactured board industry has not occurred. For example, it is often the case that the adhesive binder must be used under acidic conditions. However, board and panel manufacturers prefer to operate in an alkaline environment, since less wear and tear is encountered by production equipment.

In U.S. Pat. No. 2,786,008 issued on Mar. 19, 1957—Herschler, an adhesive binder consisting of phenol-formaldehyde (PF) and ammonium based spent sulphite liquor (NH$_4$SSL) is disclosed. In addition to producing an acidic adhesive which is slow curing, the method disclosed by Herschler is laborious and time-consuming, as it is necessary to make the alkaline PF "acid tolerant" in order to avoid precipitation of the PF resin upon mixing of same with the acidic spent sulphite liquor.

Another example of using PF to cross-link a wood waste product is that disclosed in U.S. Pat. No. 4,113,675 issued on Sep. 12, 1978—Clarke et al., wherein methylolated lignin was cross-linked by an acid catalyzed low molecular weight PF resin. It was observed that kraft lignin was itself not sufficiently reactive to under significant cross-linking with PF, and that it was thus necessary to pre-react the lignin with a methylolating agent, such as formaldehyde, so as to introduce methylol groups to the lignin molecule. Moreover, it was indicated that in order to achieve satisfactory cross-linking on curing, the pH of the binder must be acidic. Finally, the adhesive disclosed in Clarke et al. was found to be relatively slow curing.

In Canadian patent 1,214,293 issued on Nov. 18, 1986—Calve et al., an adhesive consisting of ammonium based spent sulphite liquor (NH$_4$SSL) cross-linked by a commercial PF is disclosed. It was found that while PF normally precipitates when in acidic solution with NH$_4$SSL, a useful adhesive could be obtained if the NH$_4$SSL-PF were maintained in dispersion through rigorous stirring or agitation. Again, acidic conditions, of pH 3 to 7, were required to provide acceptable modulus of rupture (MOR) test results on waferboard and particleboard manufactured with the adhesive.

In U.S. Pat. No. 4,127,544 issued on Nov. 28, 1978—Allan, a process for the partial substitution of ammonium lignosulfonate for phenol in alkaline phenolic-aldehyde resin adhesives is described. However, the NH$_4$SSL is first pre-reacted with phenol at a temperature range of 150°-300° C. under autogenous pressure prior to condensation with formaldehyde under alkaline conditions. The reaction at high temperature and pressure is expensive. Also, no wood adhesive bond test data were provided.

In U.S. Pat. No. 4,324,747 issued on Apr. 13, 1982—Sudan et al, a resin where an alkaline phenol-formaldehyde resin is simply mixed with a kraft pulping liquor and use to bond waferboard is disclosed. The phenolic resin is prepared by refluxing phenol and formaldehyde in the presence of zinc acetate or heating at lower temperature in the presence of calcium oxide. No reference to adjustment of molecular weight distribution of the phenolic resin or example of addition of ammonium salt is provided. This type of resin is slow curing and not "pre-cure" resistant.

To be acceptable for industrial use, a new adhesive must meet certain criteria. For example, it must be available as a spray dried powder or stable liquid; be quick setting if it is employed as a core adhesive for thick multi-layer panels where the resin is far from the heating source, or be "pre-cure" resistant if it is employed for bonding a monolayer panel or the face of a multi-layer panel. If the resin cures prematurely while the mat is resting on a hot caul plate before pressing or at first contact with the press platens before sufficient pressure is applied to consolidate the mat, a poor bond will ensue.

In the aforementioned examples and elsewhere, it has not been suggested or contemplated that the PF component of the adhesive be modified or specially constituted to enhance the cross-linking of the wood waste product component of the adhesive.

While a two component or "binary PF" resin, comprised of a mixture of high average molecular weight PF and low average molecular weight PF components, has long been used in the manufacture of board, heretofore, the low molecular weight PF has been added to enhance resin flow with minimum dry-out. Its unique reactivity to produce a quick setting resin when used in combination with wood waste, especially polydisperse lignin, has not been recognized and its use in combination with wood waste product not contemplated.

For example, in U.S. Pat. No. 4,269,949 issued on May 26, 1981—Hickson et al, there is disclosed a binary PF resin comprised of a mixture of high and low molecular weight resins, particularly suitable for use in hardboard applications, owing to the minimum dry-out exhibited by the adhesive.

In U.S. Pat. No. 4,433,120 issued on Feb. 21, 1984—Chiu, it was demonstrated that a liquid binary PF resin having low viscosity and low surface tension could be used for efficient spray application as fine droplets in waferboard manufacture. The liquid binary PF resin has limited pre-cure resistance due to the presence of the slower curing low molecular weight phenolic resin which is however not sufficient for a surface resin. Although the liquid binary PF resin exhibited some pre-cure resistance, this resin is relatively expensive to produce, and displayed only limited pre-cure resistance. It is also difficult to spray-dry without advancing the resin and reducing its pre-cure resistance.

In a recent study Stephens and Kutscha (Wood and Fiber Science, 19(4), 1987, pp. 353-361) fractionated a phenol-formaldehyde resin into a high and low molecular weight resin by ultrafiltration and compared the adhesive properties of each fraction to the unfractionated PF resin. They found that: "the high molecular weight resin fraction performed nearly as well as the unfractionated resin". The presence of low molecular weight phenol-formaldehyde only slightly improve the characteristic of the PF resin, and is not essential to the process.

SUMMARY OF INVENTION

On the contrary to previous findings, it has been found that a mixture of a binary PF and a polydisperse lignin, shows an unexpected high adhesive reactivity.

While in previous work, different types of phenolic resin were required, for example, with kraft or sulphite lignin which have different molecular weight distribution, in accordance with this invention results better than previous were obtained with a binary PF resin cross-linker for the lignin and independently of the lignin origin. While high molecular weight PF resin could be used alone as adhesive, with a wood waste product such as lignin, the presence of both high and low molecular weight phenolic resin is needed to produce a fast curing adhesive composition and a strong weather resistance joint. The use of high or low molecular weight PF alone with a wood waste produce such as lignin, results in a weak bond, while a balance composition of high molecular weight PF, low molecular weight PF and lignin has been found to result in an adhesive with curing and strength properties similar to a fast curing commercial phenolic resin. Both high and low molecular weight PF cross-link the lignin which is itself a mixture of high and low molecular weight particles. The small phenolic molecules are also believed to link the high molecular weight lignin polymer as the resin is cured while the large phenolic molecules link the smaller lignin molecules. This system can also be used under acidic conditions, as a water solution or dispersion.

It has also been found that the lignin, as well as their uses as a water dispersion, improves the facility of spray drying of the phenolic system resulting in a higher yield. This is regarded as important since a resin which spray drys more easily can be produced at a higher rate, increasing productivity.

In accordance with yet another aspect of this invention, the inexpensive resin can also be made to exhibit improved pre-cure resistance which is important when used as a liquid or spray-dried powder face adhesive for three-layer composite products, such as waferboard.

This was achieved by simple mixing a phenol-formaldehyde resin (one which could be used as core adhesive for a 3-layer panel, for example), a relatively large quantity of a lignin and an ammonium salt. The use of ammonium spent sulphite liquor is preferred as lignin source as it already contains the ammonium salt component. If kraft, steam hydrolysed, organosolv, SSL of other cooking base or glucose was employed, the resin flow and pre-cure resistance is capable of being controlled by addition of ammonium hydroxide and ammonium salt such as ammonium sulphate, ammonium p-tolenesulfonic acid or ammonium chloride. The use of low molecular weight lignin is often preferable as it will help to control the flow of the resin. Upon addition of sodium hydroxide or a strong base other than ammonium hydroxide, the resin was found to loose some of its pre-cure resistance. Although the presence of a lignin is much preferred, it was also found possible to slightly improve the pre-cure resistance of a phenolic resin by adding directly to it an ammonium salt. The use of a binary PF resin is preferred for pre-cure resistance in the presence of lignin and ammonium salt.

As indicated above, the present invention contemplates using binary PF to cross-link wood waste lignin in order to provide a novel quick-curing thermosetting adhesive. By employing a binary PF, it is not necessary to include the additional step of pretreating (by methylolation) lignin as was the case in Clarke et al (supra.). Furthermore, contrary to the results indicated in Canadian Patent 1,214,293, it has been found that sodium based spent sulphite liquor (NaSSL) can be employed as an adhesive component where binary PF is utilized. Importantly, satisfactory results are obtainable where the adhesive is employed under alkaline, as well as acidic, conditions. Not only is the adhesive of the present invention relatively simple to produce, but it is also quick-curing, easy to spray-dry and demonstrates improved adhesion characteristics.

An adhesive having the foregoing quick or fast curing qualities is produced by reacting preferably by mixing the binary PF in solution with lignin which advantageously, can be obtained from wood, pulp, waste, such as that produced in the sulphite, kraft, organosolv or steam hydrolysed pulping process (of course mixing the various ingredients by powder to powder blending is also possible). As previously noted, the binary PF consists of a mixture of high average molecular weight PF (high MW PF) and low average molecular weight PF (low MW PF). As indicated herein, binary PF has been found to be an effective cross-linker for the aforementioned lignins to produce a quick-curing adhesive having improved adhesion characteristics.

Preferably, either the low MW PF is mixed with the lignin prior to mixing with the high MW PF, or, the high MW PF and the low MW PF are mixed concurrently with the lignin.

The adhesive system can be used as an alkaline water (aqueous) solution (pH 9-11) by simple mixing of the alkaline binary PF with the lignin copolymer and slight addition of a base such as sodium hydroxide if required to increase the resin solubility or by utilization of a binary PF having a concentration of low MW PF, for example, 85% low MW PF and 15% high MW PF. Excessive addition of sodium hydroxide will result in advancing the resin particularly during spray-drying, and reducing its adhesive properties. As well, the pH of the solution can be lowered to disperse the adhesive (pH 3-9), or the adhesive may be separated from the solution, or spray-dried. Slight improvement in lignin-PF reactivity has been observed if the lignin-PF mixture is heated at low temperature (for example 2 hours at 50° C.), prior to spray-drying.

The weight ratio of the high MW PF to the low MW PF can be from 1:1 to 9:1, and is preferably in the area of 7:3, but where an acid water solution is preferred, the ratio can be 1:9 to 1:4, preferably 15:85.

The average molecular weight of the high MW PF is preferably from 1,200 to 10,000, and the average molecular weight of the low MW PF is from 200 to 1,200. The weight ratio of binary PF to lignin may be from 9:1 to 1:9, preferably 80:20.

The weight ratio of the binary PF to lignin can range from 9:1 to 1:9 and is preferably 85:15 for the production of a quick setting adhesive.

The rendering of the adhesive "pre-cure" resistant contemplates the addition of an ammonium salt to a PF resin to provide a novel pre-cure resistant thermosetting adhesive. This type of adhesive is primarily intended for use as a face adhesive for three layer waferboards. Employing a binary PF for this type of resin is preferred. A face or a core PF resin (preferably core PF as more PF could be replaced with lignin) presently used for the manufacture of waferboard can be used. The amount of lignin and/or ammonium salt, and the choice of PF copolymer will determine the rate of curing of the adhesive and its pre-cure resistance. As before, the adhesive can be transformed into a useful adhesive powder by spray drying and is generally employed under alkaline conditions.

To produce the "pre-cure" resistant adhesive, as before, a PF in solution (and which preferably a binary PF) is mixed with a lignin which advantageously is in waste form and recovered from one of the different pulping processes, and an ammonium salt. As previously noted, the ammonium salt may consist for example of ammonium lignosulfonate, ammonium sulphate, ammonium p-toluenesulfonic acid or ammonium chloride.

The ammonium salts are generally acidic and will cause precipitation of the alkaline phenolic resin upon mixing. This may be prevented by concurrent slight addition of ammonium hydroxide. Again excessive addition of strong base other than ammonium hydroxide such as sodium hydroxide will reduce the flow and pre-cure resistance of the resin. The content of ammonium salt (salt other than ammonium spent sulphite liquor) in the resin mixture may vary from 1 to 30% based on the total dry weight of the resin mixture and is preferably 2-6%.

In the case of NH$_4$SSL, the salt being also the lignin copolymer, the PF to NH$_4$SSL weight ratio can vary from 8:2 to 1:9 and is preferably 70:30. The preferred weight ratio is also 70:30 for lignin sources other than NH$_4$SSL such as for example, sodium or calcium based SSL or steam hydrolysed lignin. If a strongly alkaline kraft lignin is being used, it has been found that by removing part of the sodium salt content of the kraft lignin by precipitation of the lignin in acidic solution and washing with a dilute acid water solution, may be preferable, in order to avoid formation of excess of sodium hydroxide in the final resin mixture. It is also possible to formulate a phenolic resin with less sodium hydroxide to accommodate this copolymer.

As for the quick setting adhesive, the pH of the resin solution can be lowered to disperse the adhesive (pH 3-9) but it is preferably used as a water solution (pH 9-11). The resin may be spray dried into a stable powder or used as a liquid.

An important aspect of these findings is that the lignin as well as most ammonium salts are inexpensive in comparison to phenol-formaldehyde. Also important is the increase in the quantity of material recovered if spray-dried into stable powder per hour employing existing equipment, a further reduction in the adhesive production cost.

A further advantage of this finding is that the lignin and ammonium salt in a composite panel, during thermosetting, will react with any free formaldehyde present in the resin formulation and thus act as a formaldehyde scavenger.

BRIEF DESCRIPTION OF DRAWING

FIG. 1 is a graphic representation of the relationship between the percentage yield and particle size of the adhesive in powder form obtained after spray drying, and the percentage of binary PF and/or NH$_4$SSL present in the adhesive mixture before spray drying. It should be noted that the 100% NH$_4$SSL and PF were sprayed as a water solution while all the PF-NH$_4$SSL mixture were spray-dried as a dispersion at a pH of 5.0. It should be added that similar high yield (89% powder recovery based on initial resin dry weight) obtained using a resin containing kraft lignin (27%)-(NH$_4$)$_2$SO$_4$(3%)-PF(70%). The resin was spray dried as a water solution at a pH of 9.8.

DETAILED DESCRIPTION OF PREFERRED EMBODIMENTS

In the following, the method of preparing the adhesives of the invention are described. As well, test results including assessments of the adhesion characteristics of various adhesive formulations are set forth.

THE BINARY PF RESINS

There are several examples in the literature of method of preparation of binary PF resins (Ex. U.S. Pat. Nos. 3,180,784; 3,267,188; 3,591,535; 3,927,140; 4,269,949; 4,345,054; 4,433,120). As already mentioned, the unique reactivity of binary phenolic resin to produce a quick setting resin when used in combination with lignin has not been recognized. The intent is not to show how to produce a binary PF since this art has already been described in the literature, but to provide examples of binary resin formulations which could be used to demonstrate their unique reactivity when employed with wood waste products such as lignin or containing lignin.

EXAMPLE OF PREPARATION OF A BINARY PF RESIN

For the preparation of high MW resin: P-formaldehyde (167 g) was suspended in water (378 g) and heated at 95° for 30 minutes. The mixture was then cooled to 25° C. and phenol (210 g) was added followed by slow addition of sodium hydroxide (62.5 g at 50 percent solid). The temperature of the reaction was raised to 90° C. in a 60 minutes period and held until the resin reached a (Brookfield) viscosity of 50 cps (viscosity measured at 25° C.). The resin was cooled to 75° C. and held at this temperature until a viscosity of 300 cps was obtained. At this point the resin was cooled to room temperature and 10 g of sodium hydroxide was added. The resin had a weight average molecular weight ($\overline{M}w$) of 4,000 and a number average molecular weight of 1314 as measured by gel permeation chromatography (polyethylene glycol calibration).

For the preparation of the low MW resin: P-formaldehyde (148 g) was suspended in water (220° C.) and heated at 95° C. for 30 minutes. The mixture was then cooled to 25° C. and phenol (210 g) was added followed by slow addition of sodium hydroxide (30.8 g at 50 percent solid). The temperature was raised to 60° C. and held at this temperature until a Brookfield viscosity of 35 cps was obtained. At this point the resin was cooled to room temperature and sodium hydroxide (25 g) was added.

Obviously the preparation of a binary PF is not restricted to these examples. For example, a high molecular weight PF could be obtained by a using a gradient temperature starting at 60° C. and increasing to reflux and the order of addition of the various ingredients may be changed. Alkaline catalyst other than sodium hydroxide may be employed.

It is also possible to produce a binary phenolic resin in a single process instead of separately producing the low and high molecular weight components and mixing. For example, an aqueous solution of phenol, formaldehyde and a catalyst such as sodium hydroxide can be treated at a temperature of about 95° C. and for a time sufficient to produce the high molecular weight PF component. Following cooling, additional phenol, formaldehyde and catalyst is added to this component and heated within a temperature range from about 40° C. to about 65° C. for a time sufficient to generate the low molecular weight PF component of the binary PF. It is also possible to reverse the two process steps by producing the low MW PF component prior to the high MW PF component.

MIXING OF BINARY PF AND LIGNIN

An adhesive solution may be prepared by first adding the low MW PF to the lignin, and then adding the high MW PF to the mixture of low MW PF and lignin, or the low MW PF and high MW PF may be added concurrently to the lignin. Adding high MW PF directly to the lignin may result in precipitation. Following reacting the binary PF and lignin preferably by mixing, the pH of the solution may be adjusted by adding hydrochloric acid or sodium hydroxide. Optimum adhesive properties for NH$_4$SSL as the lignin component were obtained when mixed with a weight ratio of 30% low MW PF to 70% high MW PF and at a pH of 3 to 10.5.

It is also possible to add the lignin during the single process production of the high and low MW PF previously described with the lignin during the first or second stage of the binary PF production, or both. The cross-linking reaction between the lignin and binary PF is accelerated with the application of heat and thus it is possible to effect cross-linking when an aqueous solution of the binary PF and lignin is spray dried to create a dry adhesive powder.

MIXING OF PF, LIGNIN COPOLYMER AND AMMONIUM SALT

A pre-cure resistant adhesive solution is prepared by mixing ammonia, preferably ammonium salt, and more preferably an ammonium acid salt with lignin and then adding the PF resin while stirring vigorously. Addition of the ammonium acid salt directly to PF will cause its precipitation into a gummy mass rendering it difficult to work with. The mixture of PF, lignin and ammonium salt can be used as an alkaline solution by adjusting to pH 9-11 with ammonium hydroxide. The pre-cure resistance can be adjusted by varying the solid weight ratio of PF, lignin and salt.

The single process technique of producing binary PF with or without the addition of lignin thereto as above described can also advantageously be modified if it is desired that the thermosetting resin also exhibit pre-cure resistance. For example, ammonia, preferably in the form of an ammonia salt can be added with the second stage addition of phenol, formaldehyde and catalyst necessary for the production of the low molecular weight component in the binary PF. Moreover, the temperature gradients, quantities of addition and sequence of addition of the ingredients can also vary and depending upon the intended end use or characteristics of the adhesive (face or core applications and if it is to be made pre-cure resistant or not).

EXAMPLE 1

In this example, the adhesive properties of NH$_4$SSL-PF adhesives having either a high molecular weight or a low molecular weight PF component are compared with a resin prepared by mixing in a 1 to 1 weight ratio a binary PF resin and NH$_4$SSL with the results being set forth in Table 1.

TABLE 1

| | Effect of PF Resin Molecular Weight on NH$_4$SSL (50%)—PF(50%) Adhesive Properties | | | | | | | |
|---|---|---|---|---|---|---|---|---|
| | | | Board Properties[a] | | | | | |
| | Press Cycle (min.) | Density kg/m$^3$ | MOR (MPa) | | | | Torsion Shear (N · m) | |
| Resin Type | | | Dry | Wet | IB | MOE | Dry | Wet |
| Low MW PF[b] | 4 | 663 | 21.7 | 0 | 0.280 | 4290 | 7.5 | 0 |
| | 5 | 667 | 24.9 | 10.5 | 0.380 | 4310 | 11.0 | 1.8 |
| High MW PF[c] | 4 | 669 | 16.5 | 0 | 0.209 | 3776 | 5.5 | 0 |
| | 5 | 660 | 16.8 | 0 | 0.245 | 3916 | 5.6 | 0 |
| Low MW PF (50%)[c] + High MW PF (50%) | 4 | 676 | 25.4 | 12.9 | 0.378 | 4695 | 10.7 | 1.6 |
| | 5 | 667 | 26.5 | 13.4 | 0.418 | 4510 | 11.3 | 2.9 |
| Low MW PF (50%)[d] High MW PF (50%) | 5 | 663 | 25.0 | 11.8 | 0.405 | 4410 | 10.9 | 2.2 |

[a]Waferboard pressed at 210° C.
[b]Solution at pH5.
[c]Dispersion at pH5.
[d]Dispersion at pH 9.5

As the results in Table 1 indicate, the adhesive containing the binary PF yielded a better quality waferboard in comparison to an adhesive having either only a low average molecular weight or high average molecular weight PF component. Both wet and dry MOR (modulus of rupture), and MOE (modulus of elasticity)

results were superior for the binary PF-NH4SSL adhesive under both acid and alkaline conditions and exhibited comparatively higher IB (internal bond strength) values. Torsion shear test results also confirm the superiority of the binary PF-NH4SSL adhesive under both acid and alkaline conditions. Torsion shear test results also confirm the superiority of the binary PF-NH4SSL adhesive. Of particular note is that satisfactory adhesion characteristics are noted for the binary PF-NH4SSL adhesive under both acidic and alkaline conditions.

EXAMPLE 2

In the following example, an assessment of the relative efficacy of a commercial PF resin (not a binary PF) and a binary PF resin as a cross-linker for methylolated kraft lignin (MKL) was made with the results set forth in Table 2. As indicated by the superior MOR and IB values, under both acid and alkaline conditions MKL was cross-lined with the binary PF to provide an adhesive yielding a waferboard having properties superior to waferboard prepared when a commercial PF was used as MKL cross-linker.

TABLE 2

Comparison Between a Commercial PF and Experimental Binary Phenolic Resin as Crosslinker for Methylolated Kraft Lignin (MKL)[1,2]

| | | Board Properties | | |
|---|---|---|---|---|
| | | MOR (Mpa) | | |
| Resin Type | pH | Dry | Wet | IB |
| Commercial PK-MKL | 11 | 4.8 | 0 | — |
| | 9.5 | 16.1 | 8.6 | 0.28 |
| | 3.0 | 23.5 | 11.4 | 0.30 |
| Binary PK-MKL[3] | 10.5 | 25.6 | 13.1 | 0.46 |
| | 5.0 | 27.0 | 16.1 | 0.52 |

[1]Waferboards pressed 5 min. at 210° C.
[2]Resin containing 50% PF solid by weight
[3]Binary PF-MKL resin formulated from the single two stage process

EXAMPLE 3

Test results as set forth in Table 3 indicate that an NH4SSL-PF adhesive having acceptable adhesion characteristics is obtained where the weight ratio of high average molecular weight PF to low average molecular weight PF is between 1:1 and 4:1, with optimal results being obtained where the weight ratio is 7:3. As also indicated by the results of Table 3, the percentage yield of adhesive obtained upon spray drying is enhanced where high MW PF molecular weight PF is present in greater quantity, with acceptable results being obtained for binary PF having at least 70% high MW PF.

TABLE 3

Optimization of PF molecular weight distribution with relation to SSL (50%) — PF (50%) adhesive properties[1] and spray-drying yield[2]

| PF | | | MOR (MPa) | | SPRAY-DRYING |
|---|---|---|---|---|---|
| HIGH MW (%) | LOW MW (%) | MW[3] | DRY | WET | YIELD (%) |
| 0 | 100 | 280 | 22.1 | 0 | 0 |
| 30 | 70 | 600 | 26.5 | 7.0 | 0 |
| 50 | 50 | 850 | 25.1 | 9.8 | 13 |
| 70 | 30 | 1300 | 25.5 | 14.0 | 76 |
| 80 | 20 | 1350 | 27.1 | 12.3 | 82 |
| 100 | 0 | 1590 | 16.9 | 0 | 90 |

[1]Waferboard of 11.1 mm thickness press 4 minutes at 210° C.
[2]Spray dried with a laboratory spray-dryer (Bowen BE 1031) at 165° C. inlet and 90° outlet temperature.
[3]Molecular weight determined by size exclusion chromatography (SEC) relative to poly (ethylene glycol) standards.

EXAMPLE 4

In this example, a quick curing adhesive consisting by weight of 15% lignin of various origin and 85% binary PF resin (comprised of a 1:1 by weight mixture of high and low average molecular weight PF) was prepared. As indicated by the test results as summarized in Table 4, the binary PF resin effectively cross-linked each of the various lignin copolymers identified in Table 4 to produce an adhesive having adhesion characteristics comparable to a commercial PF adhesive.

TABLE 4

Effect of lignin type on binary PF (85%) — lignin (15%) adhesive properties for homogeneous waferboards[1]

| RESIN TYPE | RESIN pH | PRESS CYCLE | MOR MPa | |
|---|---|---|---|---|
| | | | DRY | WET |
| Kraft Lignin | 10.3 | 3 | 28.0 | 13.7 |
| Steam Hydrolyzed Lignin | 9.5[2] | 3 | 29.5 | 14.7 |
| NH4SSL | 8.5 | 4 | 28.9 | 14.2 |
| NaSSL | 9.0 | 4 | 26.2 | 13.6 |
| Commercial PF | | 3 | 28.8 | 14.8 |

[1]Panel 11.1 mm thickness press 3 minutes at 210° C. with 2.0% resin.
[2]Lignin-PF resin heated 2 hours at 50° C. prior to spray drying.

EXAMPLE 5

A further advantage of utilizing a binary PF resin to cross-link a lignin copolymer such as NH4SSL is that enhanced yields may be obtained upon spray drying. As graphically illustrated in FIG. 1, the yield on spray drying an NH4SSL-binary PF dispersion was greatest for a dispersion consisting of 50% by weight NH4SSL and 50% by weight binary PF. This is important as it indicates that more kilogram per hour of a lignin-phenolic resin can be produced in a commercial spray dryer, in comparison to spray drying of PF without lignin. This represents a higher production rate and important saving for a resin powder producer.

The following examples illustrate the properties of pre-cure resistant adhesives obtained from a mixture of a PF, a lignin and an ammonium salt. The PF may be a surface phenolic resin or a faster curing core phenolic resin. The core phenolic resin produces a faster curing pre-cure resistant PF-lignin adhesive.

EXAMPLE 6

In a mill, a waferboard mat may rest on a caul plate at 140°-150° C. for a few minutes before being transferred into the press. In the press, the mat may then rest on the hot press platen few seconds before press closing to target panel thickness. If the resin is not pre-cure resistant and cures prematurely, a poor bond will result. One method to differentiate between a face and core resin is the stroke cure test. The test involved placing 0.75 g of resin on a hot platen set at a temperature of 150° and spread back and forth until hardened and cannot be spread further. A fast core resin will generally have a short stroke cure of 15-25 seconds, which compares to 35-45 seconds for a face pre-cure resistant adhesive.

As shown in Table 5, a resin made from NH₄SSL (30%) and PF (70%) had a stroke cure test of 42 seconds, if ammonium sulphate salt was added, longer stroke cure test could be obtained. It was also possible to obtain a resin with stroke cure test comparable to a commercial face resin (35-45 seconds) from kraft lignin (27%), (NH₄)₂ SO₄ (3%) and a commercial PF (70%). Similar results were also obtained with lignin other than kraft or NH₄SSL, such as NaSSL or organosolv lignin.

TABLE 5

Effect of lignin and ammonium sulphate additives on stroke cure test of commercial core phenolic resin powder (sprayed at 200° C. inlet and 90° C. outlet)

| | | RESIN POWDER COMPOSITION | | | Stroke Cure |
|---|---|---|---|---|---|
| PF$_a$¹ (%) | PF$_b$¹ (%) | Kraft² (%) | NH₄SSL (%) | (NH₄)₂SO₄ (%) | Test at 150° C. (sec.) |
| 100 | 0 | 0 | 0 | 0 | 24 |
| 0 | 100 | 0 | 0 | 0 | 26 |
| 70 | 0 | 0 | 30 | 0 | 42 |
| 67 | 0 | 0 | 30 | 3 | 62 |
| 0 | 67 | 0 | 30 | 3 | 38 |
| 70 | 0 | 30 | 0 | 0 | 22 |
| 70 | 27 | 0 | 0 | 3 | 40 |
| 94 | 0 | 0 | 0 | 6 | 36 |

¹PF$_a$ and PF$_b$ are core PF resin
²Kraft lignin precipitated and washed to remove the free inorganic salts

EXAMPLE 7

In other methods to test the resistance of an adhesive to "pre-cure", the caul plate was heated in an oven at 200° C. and then placed on the waferboard mat (wafers blended with the adhesive being tested) for five minutes under 25 kg weight. The mat was then pressed in a normal manner. The panels were then tested for internal bond strength (IB). For the pre-cure resistant adhesives, it was found the hot caul plate treatment had no adverse effects on IB. The temperature of the 1.6 mm thick metal caul plate at exit from the oven was observed to be 190° C. At contact with the wood furnish, the caul plate cooled off gradually to approximately 80° C. within the 5 minute treatment.

The results set forth in Table 6 below are for waferboard with the mat treated with a hot caul plate prior to pressing. The hot caul plate treatment had an adverse effect on IB and face failure for the sample bonded with the commercial core PF and also the binary PF copolymer. No adverse effect was noticed for the panels bonded with NH₄SSL-PF and kraft-PF-(NH₄)₂SO₄ resins as IB and face failure test results were similar to those obtained with panels bonded with the commercial face PF control.

TABLE 6

Effect of caul plate heat treatment of mats¹ prior to pressing on mechanical properties of three layer waferboards² bonded with commercial and experimental resins

| Face Resin⁴ | Density (kg/m³) | IB (MPa) | Face³ Failure (%) |
|---|---|---|---|
| Commercial Face PF | 675 | .467 | 8 |
| PF⁵ Crosslinker | 664 | .390 | 42 |
| NH₄SSL (30%) — PF⁵(70%) | 652 | .450 | 8 |
| Kraft (27%) — PF⁵(70%) — (NH₄)₂SO₄(3%) | 650 | .509 | 8 |
| Commercial Core PF | 648 | .179 | 100 |

¹Caul plate heated in an oven at 200° C. then placed on top of waferboard mat 5 minutes under 55 kg weight
²Panel pressed 4 minutes at 220° C. with 2.0% resin
³Sample delamination (failure at surface layers during testing of 12 IB samples
⁴The core wafers were bonded with a commercial core PF for all the panels
⁵Experimental resin composed of high MW PF (70%) and low MW PF (30%) resins

I claim:

1. A method of producing a fast curing cross-linked thermosetting adhesive having a pH of from 3 to 11 and which is useful for binding lignocellulosic materials together, comprising the step of reacting at an elevated temperature binary phenol-formaldehyde consisting of high average weight phenol-formaldehyde and low average molecular weight phenol-formaldehyde, wherein the weight ratio on a dry weight basis of said high average weight phenol-formaldehyde to said low average weight phenol-formaldehyde is from 80:20 to 50:50, with a wood pulping waste lignin recovered from at least one of the sulphite, Kraft, organosolv and steam hydrolysed wood pulping processes, and wherein an ammonium salt selected from the group consisting of ammonium sulphate, ammonium p-toluenesulfonic acid and ammonium chloride is added to at least one of said lignin and said binary phenol-formaldehyde prior to reacting said lignin and said binary phenol-formaldehyde.

2. A method of producing a fast curing cross-linked thermosetting adhesive having a pH of from 3 to 11 and which is useful for binding lignocellulosic materials together, comprising the step of reacting at an elevated temperature binary phenol-formaldehyde consisting of high average weight phenol-formaldehyde and low average molecular weight phenol-formaldehyde, wherein the weight ratio on a dry weight basis of said high average weight phenol-formaldehyde to said low average weight phenol-formaldehyde is from 80:20 to 50:50, with a wood pulping waste lignin recovered from at least one of the sulphite, Kraft, organosolv and steam hydrolysed wood pulping processes, and wherein an ammonium salt selected from the group consisting of ammonium based spent sulphite liquor, ammonium sulphate, ammonium p-toluenesulfonic acid is added to said lignin and said binary phenol-formaldehyde, and the pH of the adhesive is adjusted from between 9 to 11 by the addition of ammonium hydroxide.

3. A method of producing a fast curing cross-linked thermosetting adhesive having a pH of from 3 to 11 and which is useful for binding lignocellulosic materials together, comprising the step of reacting at an elevated temperature binary phenol-formaldehyde consisting of high average weight phenol-formaldehyde and low average molecular weight phenol-formaldehyde wherein the weight ratio on a dry weight basis of said high average weight phenol-formaldehyde to said low average weight phenol-formaldehyde is from 80:20 to 50:50 with a wood pulping waste lignin recovered from at least one of the sulphite, Kraft, organosolv and steam hydrolysed wood pulping processes and wherein an ammonium salt is added to said adhesive in an amount from 0.1 to 30% on a dry weight basis, and the pH of the adhesive is adjusted from between 7 to 11.

4. A pre-cure resistant thermosetting surface adhesive useful for binding lignocellulosic materials together, said adhesive having a pH from 7 to 11 and comprising cross-linked lignin and phenol-formaldehyde, and an ammonium salt selected from the group consisting of at least one of ammonium sulphate, ammonium p-toluenesulfonic acid and ammonium chloride.

5. A method of producing a pre-cure resistant cross-linked thermosetting surface adhesive which comprises admixing an ammonium salt selected from the group consisting of at least one of ammonium sulphate, ammonium p-toluenesulfonic acid and ammonium chloride, lignin and phenol-formaldehyde for a time and at a temperature sufficient to cross-link said lignin and said phenol-formaldehyde and adjusting the pH of said adhesive to a pH range from 7 to 11.

* * * * *